July 7, 1925.
G. A. THOMPSON
THRASHING MACHINE
Filed Aug. 23, 1924
1,544,954
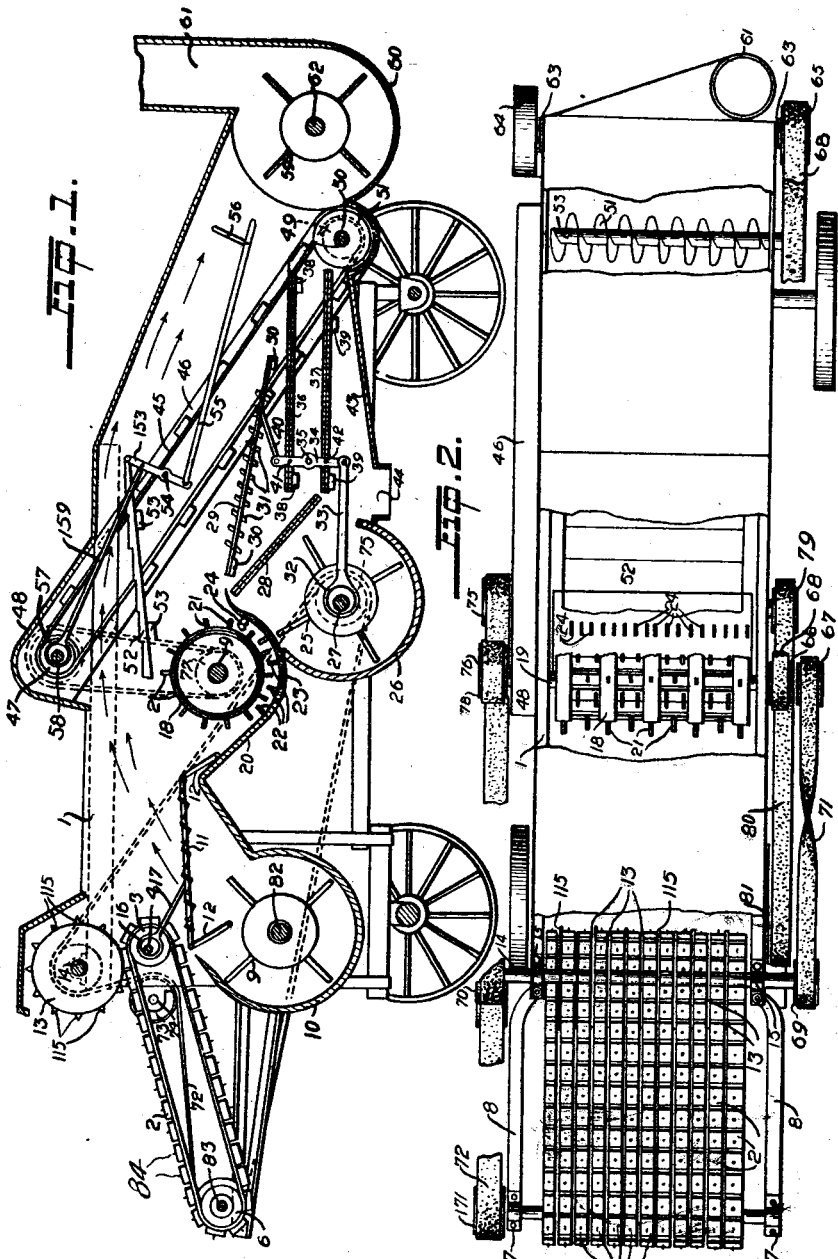
INVENTOR
GEORGE A. THOMPSON
By Fetherstonhaugh & Co
Attorneys Patented July 7, 1925.

1,544,954

UNITED STATES PATENT OFFICE.

GEORGE ALBERT THOMPSON, OF WASHAGO, ONTARIO, CANADA.

THRASHING MACHINE.

Application filed August 23, 1924. Serial No. 733,807.

*To all whom it may concern:*

Be it known that I, GEORGE ALBERT THOMPSON, a subject of the King of Great Britain, and a resident of the village of Washago, in the county of Ontario, in the Province of Ontario, Canada, have invented certain new and useful Improvements in Thrashing Machines, of which the following is the specification.

My invention relates to improvements in thrashing machines and the object of the invention is to devise a thrashing machine by which the sheaves will be cut up before they are fed into the thrashing cylinder.

A further object is to obviate the chaffing rack for separating the grain from the straw by the substitution of an air blast, and a still further object is to devise means behind the cylinder teeth for cutting any straw that may have failed to have been cut on entering the machine, and another object is to devise a machine which will be smaller and considerably lighter to drive than those at present in use.

My invention consists of a thrashing machine constructed and arranged all as hereinafter more particularly described and illustrated in the accompanying drawing in which:

Fig. 1 represents a side elevational view of by machine, the side plate being removed to expose the interior, and Fig. 2 is a plan view thereof, the top plate being broken away.

Like characters of reference indicate corresponding parts in the different views.

1 is the frame of the machine. 2 are the sheaf conveying belts mounted on their inner ends on the drum 3, the laterally extending axle 4 of which is mounted in the bearings on either side of the frame of the machine. The outer end of the sheaf conveying belts are carried by the drum 6 rotatably mounted in the bearings 7 which are carried by the rearwardly extending arms 8 mounted on either side of the rear end of the machine.

9 is an air fan rotatably mounted in the casing 10 which is situated immediately below the inner end of the sheaf conveying belt 2. 11 is a chaffing screen reciprocably mounted on the arms 12 which are pivoted at their upper ends to the forward and rear ends respectively of the chaffing screen and at their lower ends to the frame of the machine, the chaffing screen being constructed of alternate laterally extending strips of lath and screen positioned, as is clearly illustrated in the drawing, so that the air blast from the fan 9 is practically unobstructed in passing through the screen. 13 are a plurality of saw discs mounted on the shaft 14 in the bearings 15 situated on either side of the frame of the machine, said saw discs 13 are provided on their peripheries with teeth 115 which are adapted to pass between the sheaf conveying belts 2. 16 is an eccentric mounted upon the shaft 4 and provided with the eccentric rod 17 which is pivotally connected at its lower end to the chaffing screen 11 intermediately of its length. 18 is the thrashing cylinder rotatably mounted upon the shaft 19 being situated at the bottom of the chute 20 in the bottom of the machine, the thrashing cylinder 18 is provided with rows of radially extending teeth 21, said teeth being adapted to pass through the rows of inwardly extending teeth 22 provided in the concaved casing 23 at the bottom of the chute 20.

24 is a row of saw edged cutters provided on the upper end of the concaved casing 23, said saw edged cutters being positioned so that they pass between the teeth 21 of the thrashing cylinder. 25 is a blower fan rotatably mounted upon the laterally extending shaft 27 which is journalled in the fan casing 26. 28 is a screen provided at the mouth of the fan casing 26 so as to prevent any of the chaff dropping into the fan. 29 is a chaffing tray reciprocably mounted on the bearing blocks 30 and provided with a plurality of slats 31. 32 is an eccentric mounted upon the shaft 27 and provided with the eccentric rod 33, the free end of which is connected to the arm 34 which is pivotally mounted intermediately of its length on the pin 35 on the side of the casing. 36 and 37 are a pair of sieves slidably mounted upon the blocks 38 and 39 respectively, the sieve 37 being of finer mesh than the sieve 36.

40 is an arm pivotally connected at its upper end to the chaffer 29 intermediately of its length and at its lower end to the upper end of the lever 34, said lever 34 being pivotally connected to the sieves 36 and 37 by means of the pins 41 and 42. 43 is an inclined plate provided in the vicinity of the forward end of the machine under the sieve 37 and adapted to convey the grain down to the grain chute 44 in the bottom of the machine. 45 is a belt conveyor mounted in the casing 46 on the off side of the machine, the upper end of the conveyor being mounted upon the drum 47 which is housed in the upwardly projecting portion 48 of the casing 46, the lower end of the conveyor being mounted upon the drum 49 which is journalled upon the laterally extending shaft 50 mounted in the upper forward portion of the casing 1.

51 is a screw conveyor on the shaft 50, said screw conveyor being adapted to pick up any grain heads that may have passed the sieves 36 and 37, dropping them into the belt conveyor 45, being dropped from thence onto the cylinder 18. 52 is a return pan or deck mounted in the casing 1 in the vicinity of its top and extending from side to side thereof, said pan 52 being slidably mounted upon the blocks 53 and pivotally connected at its forward end to the upper end of the arm 153 which is pivotally mounted on the stud 54 on the casing 1. 55 is a downwardly extending chaffing conveyor deck extending between the sides of the casing of the machine, said deck being pivotally mounted at its lower end on the arms 56 which are pivotally mounted at their upper ends to the side of the machine. The upper end of the deck 55 is pivotally connected to the lower end of the arm 53.

57 is an eccentric mounted upon the drum carrying shaft 58, said eccentric being provided with the eccentric rod 159, the free end of which is pivotally connected to the upper end of the arm 53. 59 is a wind stacking fan situated in the casing 60 in the rear end of the machine, said casing being provided with the usual cut straw conveyor pipe 61. The wind stacking fan 59 is mounted upon the shaft 62 which is journalled in the bearings 63. 64 is a pulley mounted upon the end of the shaft 62 on the side of the machine, said pulley adapted to carry a driving belt which in turn is connected to any suitable driving means. 65 is another pulley mounted upon the end of the shaft 62 upon the near side of the machine. 66 and 67 are pulleys mounted upon the protruding end of the shaft 19, the pulley 66 being connected to the pulley 65 by means of the belt 68. The saw carrying shaft 14 protrudes on each end from the bearings 15 and carries on the near side end of the pulley 69, and on the off side end the pulley 70, the pulley 69 being connected to the pulley 67 by means of the crossed belt 71. The drum carrying shaft 83 is provided on the off side with the pulley 171 which is connected to the pulley 70 by means of the belt 72, the idler pulley 73 which is mounted on the bearings 74 being inserted so as to give the belt a larger bearing surface over the pulley 70, said belt 72 passes from the pulley 70 down to the pulley 75 which is mounted upon the protruding end of the shaft 27 upon the off side of the machine. The belt 72 then passes back to the pulley 171.

The shaft 58 of the belt conveying drum 47 protrudes from the casing 48 and is provided with the pulley 76. 77 is a pulley provided upon the protruding end of the shaft 19 upon the off side of the machine, said pulley 77 being connected to the pulley 76 by means of the belt 78. The fan shaft 27 is provided on its protruding end with the pulley 79 and is connected by means of the belt 80 with the pulley 81 on the fan shaft 82.

I will now describe the operation of my machine.

The sheaves of grain are placed upon the sheaf conveying belt 2, being held in place by means of the outwardly extending spikes 84 upon such belt. The sheaves are placed upon the belt laterally which is contrary to the usual practice in which the sheaves are fed longitudinally into the machine. The sheaves then pass under the saw discs 13, the stalks being cut up into some two inch lengths and dropped onto the chaffing screen. As the cut stalks are considerably lighter than the ears or heads of the grain, such cut stalks will be blown by the fan 9 in the direction shown by the arrows in the drawing, thus leaving the heads which drop between the thrashing cylinder 18 and the concaved plate 23. The grain or heads pass through the teeth 21 and 22 of the cylinder and concaved plate respectively, coming into contact with the saw edged cutters 24 which cut up any straw which may have failed to have been cut upon entering the machine. The grain is then dropped onto the chaffing tray 29 where it is agitated thereon, said tray being reciprocated by means of the eccentric 32 which is connected to such tray by means of the eccentric rod 33, arm 34 and lever 40.

While the grain is being agitated, a blast of air is blown through the chaffer from the fan 25 thus subjecting the grain to a second cleaning. The grain then drops onto the sieve which is agitated from the arm 34, from thence onto the sieve 37 from which it passes onto the inclined bottom 43 of the machine and from thence into the grain chute 44.

When the cut straw is blown from the grain by the fan 9, it passes onto the pan 52 which is stepped so as to prevent any grain which may have been carried by the blast and dropped onto the pan from passing thereover, the pan being agitated by means of the eccentric 57 which is connected to the lever 153 by means of the eccentric rod 159, the lever 153 being connected to the pan.

It will be seen that the agitation of the pan will shake any heads that may be carried thereon back upon the thrashing cylinder 18. The cut straw that is blown thereover is dropped onto the chaffing deck 55 which is also agitated by the lever 153 being connected to its lower end, said chaffing deck shaking the straw into the wind stacker. The screw conveyor 51 is also provided to convey any grain that may drop off the end of the chaffing deck 55 or be blown over the sieve 36 into the belt conveyor 45 which carries it upwardly and drops it onto the cylinder 18.

The driving of the machine is as follows:

The wind stacker 59 which is provided with the shaft 62 carries the pulleys 64 and 65 which are driven in an anti-clockwise direction. The pulley 66 mounted upon the shaft 19, is also rotated in an anti-clockwise direction by means of the belt 68. The shaft 19 also carries the pulley 67 which rotates in the anti-clockwise direction, said pulley being connected to the pulley 69 on the shaft 14 by means of the crossed belt 71, the crossing of the belt causing the pulley 69 and consequently the saws 13 and the pulley 70 to rotate in a clockwise direction. As the pulley 70 is directly connected to the pulley 71 mounted upon the drum shaft 83, such drum and consequently the sheaf conveyor belt will move in a clockwise direction. The pulley 75 on the fan shaft 27 also being driven by the belt will rotate in a clockwise direction. The pulley 79 will also move in a clockwise direction as it is mounted upon the protruding end of the shaft 27 upon the inner side of the machine. Pulley 81 mounted upon the fan shaft 82 will move in the same direction being connected to the pulley 79 by means of the belt 71.

As the cylinder 18 rotates in an anti-clockwise direction and is mounted on the shaft 19 which is provided with the pulley 77 which is connected to the pulley 76 on the shaft 78 of the upper belt conveyor drum 47, such belt conveyor drum will also move in an anti-clockwise direction.

From the above description it will be seen that I have devised a thrashing machine which is considerably smaller and more compact than the usual type of machine, and by the substitution of air blasts for the usual heavy chaffing racks or decks, have constructed a machine which will be much lighter to run and considerably lighter in weight, also by the use of circular saws cutting the straw into short lengths, the use of heavy cutting knives, is obviated, the steady rotation of the saws permitting them to be made comparatively thin, so that they do not lose their edge when used for a short period, as do the reciprocating cutters which have to be made from much heavier material. By the insertion of a row of saw edged knives in the cylinder concave, the complete cutting of any straw that may have passed the initial cutting, is insured, such straw being carried into the wind stacker by the second blower fan.

What I claim as my invention is:

1. In a thrashing machine, the combination with the sheaf feeding means and the cylinder, of means for permitting the sheaves to be fed crosswise into the machine, a plurality of rotatable cutters mounted in the machine between the sheaf feeding means and the thrashing cylinder, and means for separating the cut stalks from the sheaf heads prior to the heads being fed into the thrashing cylinder.

2. In a thrashing machine, the combination with the sheaf feeding means and the thrashing cylinder, of means for permitting the sheaves to be fed crosswise into the machine, means for cutting up the sheaf stalks, a blower fan situated between the sheaf cutting means and the thrashing cylinder, and means for passing the cut sheaves over the blower fan to separate the sheaf heads from the cut straw.

3. In a thrashing machine, the combination with the sheaf feeding means and the thrashing cylinder, of means for permitting the sheaves to be fed crosswise into the machine, a plurality of rotatable cutters mounted in the machine between the sheaf feeding means and the thrashing cylinder, a blower fan situated between the sheaf cutters and the thrashing cylinder, and means for passing the cut sheaves over the blower fan to separate the sheaf heads from the cut straw.

4. In a thrashing machine, the combination with the sheaf feeding means and the thrashing cylinder, of means for cutting up the sheaf stalks prior to being fed into the thrashing cylinder, a blower fan interposed between the sheaf feeding means and thrashing cylinder, means for conveying the cut stalks from the machine, and means for cleaning the grain disposed between the thrashing cylinder and the stalk conveying means.

5. In a thrashing machine, the combination with the sheaf feeding means and the thrashing cylinder, of means for cutting up the sheaf stalks prior to being fed into the thrashing cylinder, a blower fan interposed between the sheaf feeding means and thrashing cylinder, means for conveying the cut stalks from the machine, a blower fan disposed between the thrashing cylinder and the stalk conveying means, a grain chute, and means for agitating the grain upon its being passed from the thrashing cylinder to the grain chute.

6. In a thrashing machine, the combination with the sheaf feeding means and the thrashing cylinder, of means for cutting up the sheaf stalks prior to being fed into the thrashing cylinder, a blower fan interposed between the sheaf feeding means and thrashing cylinder, means for conveying the cut stalks from the machine, a blower fan disposed between the thrashing cylinder and the stalk conveying means, a chaffing rack, sieves interposed between the chaffing rack and the grain chute and means for agitating the sieves.

7. In a thrashing machine, the combination with the sheaf feeding means and the thrashing cylinder, of means for cutting up the sheaf stalks prior to being fed into the thrashing cylinder, a blower fan interposed between the sheaf feeding means and thrashing cylinder, means for conveying the cut stalks from the machine, a grain conveyor disposed between the thrashing cylinder and the cut stalk conveying means, and means for conveying grain back to the thrashing cylinder.

8. In a thrashing machine, the combination with the sheaf feeding means and the thrashing cylinder, of means for cutting up the sheaf stalks prior to being fed into the thrashing cylinder, a blower fan interposed between the sheaf feeding means and thrashing cylinder, means for conveying the cut stalks from the machine, a spiral grain conveyor disposed between the thrashing cylinder and the stalk conveying means, a conveyor belt for conveying the grain back to the thrashing cylinder, and a grain agitating means interposed between the conveying belt and the thrashing cylinder.

9. A thrashing machine comprising a plurality of sheaf feeding belts, a plurality of rotatable sheaf cutters interposed between such sheaf feeding belts, a thrashing cylinder, a blower fan disposed between the cutters and the thrashing cylinder, means for agitating the cut sheaves over the blower fan, means conveying the cut stalks from the machine, a second blower fan disposed between the thrashing cylinder and the cut stalk conveying means, a grain chute, a chaffing rack, a plurality of reciprocable sieves disposed between the chaffing rack and the grain chute, and a conveyor belt situated between the thrashing cylinder and the cut stalk conveying means.

GEORGE ALBERT THOMPSON.